United States Patent
Luo et al.

(10) Patent No.: US 12,472,673 B2
(45) Date of Patent: Nov. 18, 2025

(54) HIGH CRYSTALLINE POLY(LACTIC ACID) FILAMENTS FOR MATERIAL-EXTRUSION BASED ADDITIVE MANUFACTURING

(71) Applicant: JF Polymers (Suzhou) Co. Ltd., Changshu (CN)

(72) Inventors: Xiaofan Luo, Shanghai (CN); Zhaokun Pei, Weifang (CN)

(73) Assignee: JF Polymers (Suzhou) Co. Ltd., Changshu (CN)

( * ) Notice: Subject to any disclaimer, the term of this patent is extended or adjusted under 35 U.S.C. 154(b) by 0 days.

(21) Appl. No.: 15/309,255

(22) PCT Filed: May 8, 2015

(86) PCT No.: PCT/CN2015/078566
§ 371 (c)(1),
(2) Date: Nov. 7, 2016

(87) PCT Pub. No.: WO2015/169257
PCT Pub. Date: Nov. 12, 2015

(65) Prior Publication Data
US 2017/0066188 A1    Mar. 9, 2017

(30) Foreign Application Priority Data
May 9, 2014    (WO) ................ PCT/CN2014/077119

(51) Int. Cl.
*B29C 48/05*    (2019.01)
*B29C 48/00*    (2019.01)
(Continued)

(52) U.S. Cl.
CPC ............ *B29C 48/05* (2019.02); *B29C 48/022* (2019.02); *B29C 48/06* (2019.02); *B29C 64/118* (2017.08);
(Continued)

(58) Field of Classification Search
CPC ............ B29C 67/0055; B29C 47/0004; B29C 71/0063; B29C 48/05; B29C 48/022;
(Continued)

(56) References Cited

U.S. PATENT DOCUMENTS

| | | | |
|---|---|---|---|
| 5,121,329 A | 6/1992 | Crump | .......................... 700/119 |
| 7,754,807 B2 | 7/2010 | Priedeman, Jr. et al. | .... 524/556 |

(Continued)

FOREIGN PATENT DOCUMENTS

| | | |
|---|---|---|
| GB | 1048088 A | 11/1966 |
| JP | 2005336468 A | * 12/2005 |

(Continued)

OTHER PUBLICATIONS

Properties of Polylactide Inks for Solvent-Cast Printing of Three-Dimensional Freeform Microst; Guo et al. (Year: 2014).*

(Continued)

*Primary Examiner* — Matthew D Matzek
(74) *Attorney, Agent, or Firm* — Alvin T. Rockhill

(57) ABSTRACT

Provided is a new and better solution to the problems associated with the premature softening of PLA filaments in the additive manufacturing of three dimensional articles. It is based upon the finding that poly (lactic acid) filaments with high crystallinity offer much better resistance to heat-induced softening. The crystalline poly (lactic acid) filament can accordingly be used in the additive manufacturing of three dimensional articles without encountering the problems associated with premature softening, such as poor quality and printer jamming. The crystalline poly (lactic acid) filaments can also be used in additive manufacturing of three dimensional articles without compromising the quality of the ultimate product, reducing printing speed, increasing cost, or leading to increased printer complexity. It more specifically discloses a filament for use in three-dimensional (Continued)

printing which is comprised of crystalized poly (lactic acid), wherein said filament has a diameter which is within the range of 1.65 mm to 1.85 mm.

20 Claims, 3 Drawing Sheets

(51) Int. Cl.
| | |
|---|---|
| B29C 48/06 | (2019.01) |
| B29C 64/118 | (2017.01) |
| B29C 71/00 | (2006.01) |
| B29C 71/02 | (2006.01) |
| B33Y 10/00 | (2015.01) |
| B33Y 70/00 | (2020.01) |
| C08G 63/08 | (2006.01) |
| D01D 5/08 | (2006.01) |
| D01D 10/04 | (2006.01) |
| D01F 6/62 | (2006.01) |
| D02J 13/00 | (2006.01) |
| B29C 48/02 | (2019.01) |
| B29C 48/285 | (2019.01) |
| B29C 48/30 | (2019.01) |
| B29K 67/00 | (2006.01) |
| B29K 105/00 | (2006.01) |
| B29L 31/00 | (2006.01) |

(52) U.S. Cl.
CPC .......... *B29C 71/0063* (2013.01); *B29C 71/02* (2013.01); *B33Y 10/00* (2014.12); *B33Y 70/00* (2014.12); *C08G 63/08* (2013.01); *D01D 5/08* (2013.01); *D01D 10/0409* (2013.01); *D01F 6/625* (2013.01); *D02J 13/005* (2013.01); *B29C 48/02* (2019.02); *B29C 48/2888* (2019.02); *B29C 48/30* (2019.02); *B29C 2071/022* (2013.01); *B29K 2067/046* (2013.01); *B29K 2105/0067* (2013.01); *B29K 2995/0041* (2013.01); *B29L 2031/731* (2013.01)

(58) Field of Classification Search
CPC ....... B29C 48/06; B29C 64/118; B29C 71/02; B29C 48/02; B29C 48/2888; B29C 48/30; B29C 2071/022; B29C 64/106; B33Y 10/00; B33Y 70/00; B29K 2067/046; B29K 2105/0067; B29K 2995/0041; C08G 63/08; D01D 5/08; D01D 10/0409; D01F 6/625; D02J 13/005; B29L 2031/731
USPC ........................................................ 428/401
See application file for complete search history.

(56) References Cited

U.S. PATENT DOCUMENTS

| | | | |
|---|---|---|---|
| 9,328,239 B2* | 5/2016 | Krishnaswamy | C08L 67/04 |
| 2013/0150510 A1* | 6/2013 | Onishi | C08K 5/20 |
| | | | 524/230 |
| 2014/0291886 A1* | 10/2014 | Mark | B29C 64/209 |
| | | | 264/163 |
| 2015/0231829 A1* | 8/2015 | Haider | G05B 15/02 |
| | | | 700/119 |
| 2016/0318249 A1* | 11/2016 | Kochesfahani | B29C 64/118 |

FOREIGN PATENT DOCUMENTS

| | | | | |
|---|---|---|---|---|
| JP | 2010150365 A | * | 7/2010 | |
| WO | WO-2008128448 A1 | * | 10/2008 | C08G 63/08 |
| WO | WO-2011146484 A2 | * | 11/2011 | C08K 3/04 |

OTHER PUBLICATIONS

Solvent-cast 3D printing of Biodegradable Polymer Scaffolds by Tolbert et al., published by a group of scientist at the Polymer Science and Engineering Program, and the Department of Material Science and Engineering, Lehigh University, Bethlehem, PA 18015, USA. (Year: 2021).*
Kathuria, et al., Deterioration of metal-organic framework crystal structure during fabrication of poly(L-lactic acid) mixed-matrix membranes, Polymer International, 62, pp. 1144-1151, 2013.*
Dietmar Drummer et al: "Suitability of PLA/TCP for fused deposition modeling", Rapid Prototyping Journal, vol. 18, No. 6, Sep. 28, 2012 (Sep. 28, 2012), pp. 500-507.
Extended European Search Report for EP Application 15789308.2.

* cited by examiner

HIGH CRYSTALLINE POLY(LACTIC ACID) FILAMENTS FOR MATERIAL-EXTRUSION BASED ADDITIVE MANUFACTURING

BACKGROUND OF THE INVENTION

By definition "rapid prototyping" is a group of techniques that can be used to quickly fabricate a scale model of a physical part or assembly using 3-dimensional computer aided design (CAD) data. In rapid prototyping, construction of the part or assembly is usually done in an additive, layer-by-layer fashion. Those techniques that involve fabricating parts or assemblies in an additive or layer-by-layer fashion are termed "additive manufacturing" (AM), as opposed to traditional manufacturing methods which are mostly reductive in nature. Additive manufacturing is commonly referred to by the general public as "3D printing".

According to ASTM Committee F42 on Additive Manufacturing Technologies, there are currently seven basic AM technologies: material extrusion, material jetting, binder jetting, vat photopolymerization, sheet lamination, powder bed fusion and directed energy deposition. The most widely used of these seven AM technologies is based on material extrusion. While some variations exist, this technology generally involves feeding a thermoplastic polymer in the form of a continuous filament into a heated nozzle, where the thermoplastic filament becomes a viscous melt and can be therefore extruded. The 3-dimensional motion of the nozzle or the extruder assembly is precisely controlled by step motors and computer aided manufacturing (CAM) software. The first layer of the object is deposited on a build substrate, whereas additional layers are sequentially deposited and fused (or partially fused) to the previous layer by solidification due to a drop in temperature. The process continues until a 3-dimensional part is fully constructed. The process may also involve a temporary support material that provides support to the part being built and is subsequently removed from the finished part by mechanical means or dissolution in a suitable liquid medium. This process is commonly referred to as fused deposition modeling (FDM) or fused filament fabrication (FFF). This technology was first described by the teachings of U.S. Pat. No. 5,121,329.

U.S. Pat. No. 5,121,329 more specifically discloses an apparatus for making three-dimensional physical objects of a predetermined shape by sequentially depositing multiple layers of solidifying material on a base member in a desired pattern, comprising: a movable head having flow-passage means therein connected to a dispensing outlet at one end thereof, said outlet comprising a tip with a discharge orifice of predetermined size therein; a supply of material which solidifies at a predetermined temperature, and means for introducing said material in a fluid state into said flow-passage means; a base member disposed in close, working proximity to said dispensing outlet of said dispensing head; a mechanical means for moving said dispensing head and said base member relative to each other in three dimensions along "X," "Y," and "Z" axes in a rectangular coordinate system in a predetermined sequence and pattern and for displacing said dispensing head a predetermined incremental distance relative to the base member and thence relative to each successive layer deposited prior to the commencement of the formation of each successive layer to form multiple layers of said material of predetermined thickness which build up on each other sequentially as they solidify after discharge from said orifice; and a means for metering the discharge of said material in a fluid stream from said discharge orifice at a predetermined rate onto said base member to form a three-dimensional object as said dispensing head and base member are moved relative to each other. In one embodiment of the invention described in this patent, the material is in the form of a continuous flexible strand.

Material extrusion based AM (FDM or FFF) has become quite popular over the course of the past decade, largely due to the emergence of low-cost, desktop 3D printers. Such printers feature small sizes (similar to desktop inkjet printers) and are usually sold at a price of under $5,000 (United States dollars) per unit. Examples of material extrusion based desktop 3D printers are Replicator® series 3D printers from MakerBot Industries, H-series printers from Afinia, M-series printers from MakerGear LLC, etc. Some of those 3D printers are based on open-source hardware and are available as DIY kits.

There are several thermoplastic polymers that are currently being used in material extrusion based AM processes, such as FDM or FFF. Those materials include acrylonitril-butadiene-styrene (ABS), poly(lactic acid) (PLA), polycarbonate (PC), polystyrene (PS), high impact polystyrene (HIPS), polycaprolactone (PCL), and polyamide as well as some other polymeric materials. However the most commonly used materials are ABS and PLA.

ABS has the advantage of good overall mechanical properties; however it suffers from relatively large volumetric shrinkage and the generation of unpleasant odors. Furthermore, the generation of potentially toxic degradation products during printing makes ABS a less suitable option for desktop 3D printers because such printers generally do not have a heated build envelope and an effective mechanism to eliminate the odor and toxic degradation products. PLA, on the other hand, has less volumetric shrinkage which allows it to be printed properly even without a heated build envelope. It generates no unpleasant odor during printing, and the main degradation product is lactic acid which poses minimal health risk to 3D printer users. According to many surveys, PLA is increasingly becoming the most used material for desktop 3D printers. However, PLA still suffers from a number of drawbacks, including poor impact strength and a low softening temperature. The low softening temperature leads to difficulties with extrusion and printing quality. Accordingly, some 3D printers employ PLA solutions onto a substrate to form a 3D object. Such PLA solutions harden due to the evaporation of the solvent, rather than because of a change in temperature. However, it is desirable to reduce the need for such solvents.

A schematic of a typical printer head or extruder used on a FDM/FFF 3D printer is illustrated in FIG. 1. During conventional use, a filament 1 with an average diameter of $d_F$ is moved by two counter-rotating feed rollers 2, subsequently into a filament barrel 3 with an inner diameter of $d_I$ and a heater block 4. To function properly, the filament should remain solid in the filament barrel and only becomes a viscous melt in or close to the heater block section. The solid part of filament 1 in the filament barrel 3 functions as a plunger that pushes the melt out of the nozzle 5. The nozzle orifice usually has a diameter in the range of 0.2-0.5 mm, more typically has an orifice diameter which is within the range of 0.3-0.4 mm.

During printing, heat can migrate from the heater block to the filament barrel. This can lead to premature softening of the filament in the filament barrel, when the temperature of the filament barrel gets near or higher than the softening temperature of the filament. This situation is schematically illustrated in the FIG. 2. The problem associated with premature softening of the filament is commonly encountered in applications where PLA filaments are utilized. In any case, when a PLA filament softens in the barrel of a 3D printer it becomes highly viscous and "swollen" due to both polymer relaxation as well as the compression by the portion of the filament that is still solid. This creates a large resistance between the filament and the filament barrel, resulting in inconsistent feeding or even jamming of the printer/extruder. According to many 3D printer users, printer/extruder jam is the most significant problem associated with desktop FDM/FFF printers, and premature softening is the most frequent cause of printer jams in machines that use PLA filaments. This is a particularly difficult problem in the case of large parts that require long printing times (as temperature can gradually rise over time) and in dual-extrusion printing (as one printing head has to sit idle while the other printing head is working).

There are several known approaches to deal with the problems associated with the premature softening of PLA filaments. One such solution is to increase the internal diameter of the filament barrel, $d_f$, therefore minimizing the heat transfer between the barrel wall and the filament. However, this approach leads to compromised printing quality because the more closely the filament diameter matches the internal diameter of the filament barrel the higher the quality of the article. Another solution is to add more cooling to the filament barrel by using an active cooling fan and/or a heat sink. However, this leads to more complexity and "bulkiness" of the printing head which in turn reduces printing speed and adds to cost. There is accordingly a need for an approach which does not compromise the quality of the ultimate product, reduce printing speed, and increase cost, or lead to increased printer complexity.

SUMMARY OF THE INVENTION

This invention involves a new and better solution to the problems associated with the premature softening of PLA filaments in the additive manufacturing of three dimensional articles. It is based upon the finding that poly(lactic acid) filaments with high crystallinity offers much better resistance to heat-induced softening. This is because conventional filaments which are made with amorphous poly(lactic acid) begin to soften at temperatures which approach their relatively low glass transition temperature (Tg) of 55° C. to 65° C. As the conventional filaments of amorphous poly (lactic acid) are heated there is a gradual change in viscosity with increasing temperatures (i.e. viscosity decreases gradually with increasing temperatures). This is in contrast to a dramatic change in viscosity with increasing temperature which can be realized by using the crystalline poly(lactic acid) filaments of this invention in additive manufacturing applications. The crystalline poly(lactic acid) filament of this invention can accordingly be used in the additive manufacturing of three dimensional articles without encountering the problems associated with premature softening, such as poor quality and printer jamming. The crystalline poly(lactic acid) filaments of this invention can also be used in additive manufacturing of three dimensional articles without compromising the quality of the ultimate product, reducing printing speed, increasing cost, or leading to increased printer complexity.

This invention more specifically discloses a filament for use in three-dimensional printing, said filament being comprised of crystalized poly(lactic acid), wherein said filament has a diameter which is within the range of 1.65 mm to 1.85 mm. It also reveals a filament for use in three-dimensional printing, said filament being comprised of crystalized poly (lactic acid), wherein said filament has a diameter which is within the range of 2.75 mm to 3.15 mm. The crystalized poly(lactic acid) will typically have a degree of crystallinity which is within the range of 5 percent to 40 percent and will commonly have a degree of crystallinity which is within the range of 10 percent to 30 percent. In any case, the crystalized poly(lactic acid) will typically exhibit virtually no heat of crystallization. The crystalized poly(lactic acid) will also typically have a melting point which is within the range of about 145° C. to about 185° C. as shown by the endothermic peak temperature as determined by differential scanning calorimetry (DSC). In some cases the filament will have a diameter which is within the range of 1.70 mm to 1.80 mm and in other cases the filament will have a diameter which is within the range of 2.75 mm to 3.15 mm and which is preferably within the range of 2.80 mm to 3.05 mm.

The subject invention also reveals a process for manufacturing a three-dimensional article by additive manufacturing which includes extruding a filament of poly(lactic acid) into a desired geometric shape, wherein the filament of poly(lactic acid) is crystalized poly(lactic acid).

The present invention further discloses a method for manufacturing crystalline poly(lactic acid) filaments which are particularly useful in the additive manufacturing of three dimensional articles, said method including the steps of: (1) extruding molten poly(lactic acid) into the form of an amorphous filament, (2) collecting the amorphous filament on a spool to make a spool of amorphous poly(lactic acid) filament, and (3) heating the spool of amorphous poly(lactic acid) filament to a temperature of at least the glass transition temperature of the poly(lactic acid) for a period of time which is sufficient to substantially crystallize the poly(lactic acid), and (4) allowing the spool of crystallized poly(lactic acid) filament to cool to ambient temperature.

DETAILED DESCRIPTION OF THE INVENTION

Poly(lactic acid), which is sometimes abbreviated as "PLA", is a high molecular weight polyester which is synthesized by the polymerization of lactide monomer, which is a cyclic dimer of lactic acid, or 2-hydroxypropionic acid. Lactic acid is a chiral molecule with two enantiomeric forms, l-lactic acid d-lactic acid. Typically l-lactic acid and d-lactic acid are both present in PLA. The composition of l- and d-lactic acid is critical in determining the crystallization behavior of PLA, including the degree of crystallinity and crystallization kinetics. Most commercially available PLA has higher l-lactic acid content. When d-lactic acid content increases, the degree of crystallinity, melting temperature, crystallization rate all decrease. PLA will show very little tendency to crystallize when the content of d-lactic acid exceeds 15%. The PLA for the current invention is preferred to have an l-lactic acid content in the range of 85% to 100%. Examples of such PLA materials are 2500 HP, 4032D, 2003D, 4043D and 7001D from NatureWorks LLC.

Most PLA filaments used in FDM/FFF based 3D printing are produced by melt extrusion. In the melt extrusion process, fully dried PLA pellets, along with other ingredients, are fed into a polymer extruder (either single-screw or twin-screw) with a cylindrical die and continuously extruded. The extrudate is subsequently quenched/cooled and pulled by a puller to give the desired physical dimensions before being collected. The process can also include equipment such as melt or gear pumps (to ensure a stable output), laser micrometers (on-line measurement of the physical dimensions), etc.

Figure 2:
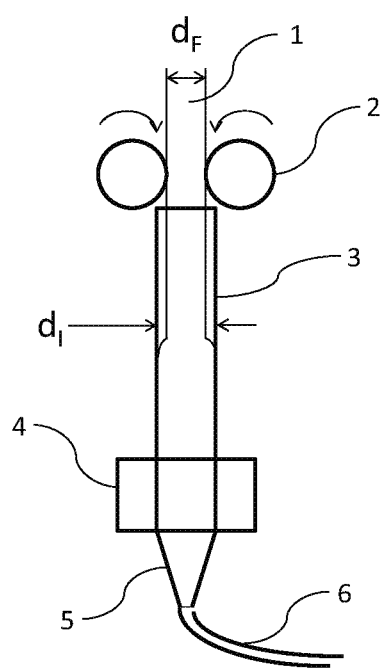
FIG. 2 illustrates the premature softening of a filament in the filament barrel of a printer used in additive manufacturing.

Melt-extruded PLA often remains amorphous due to the slow crystallization rate of PLA. Those PLA filaments currently available for FDM/FFF based 3D printing are amorphous or have negligible crystallinity, resulting in a low softening temperature in the range of 55° C. to 65° C. (as dictated by the glass transition temperature). One way to induce crystallization in an extrusion process is to increase the orientation of the filament, which is generally done by using a large draw ratio and/or a cold drawing step in the extrusion process. However this was found to be undesirable for the 3D printing application as high orientation leads to too much relaxation of the polymer that can also cause the "swelling" issue as illustrated in FIG. 2.

This invention provides a novel method to manufacture PLA filaments with high degrees of crystallinity. The method of this invention involves the following key steps: (1) manufacturing the PLA filament using the melt-extrusion process; (2) spooling the filament on a spool; (3) heat-treat the spooled PLA filament at a temperature which is within the range of the glass transition temperature (Tg) of the PLA to about 80° C. above the Tg of the PLA) for an extended period of time which is sufficient to substantially crystallize the PLA in the filament.

As mentioned before, it is desired to have a relatively low draw ratio in the melt-extrusion process. Draw ratio, for simplicity, is defined as the ratio of the diameter of the cylindrical die used on the extruder to the final filament diameter. For example, if a 3 mm die is used to manufacture a filament of 1.75 mm diameter, the draw ratio is 3/1.75=1.714. Draw ratio affects both the heat-treat step (discussed later) and the 3D printing process. It was found that the draw ratio should be in the range of 1 to 3.5, and is preferred to be in the range of 1.1 to 1.75.

Before applying the heat-treat step, it is critical to have the filament spooled. Spooling allows the filament to be under slight tension which can help maintain the correct physical dimensions and prevent too much "kinkiness" when heat is applied.

The heat-treat step is the step that imparts crystallinity to the PLA filament. Annealing the filament at a temperature which is above the Tg of the poly(lactic acid) for an extended period of time allows the PLA to slowly crystallize. The temperature range suitable for this step is from the Tg of the PLA to 80° C. above the Tg of the PLA, and preferred to be in the range of 10° C. above the Tg of the PLA to 40° C. above the Tg of the PLA. For instance if the PLA has a Tg of about 60° C., the preferred heat-treat temperature will be in the range of about 70° C. to 100° C. The choice of temperature should be high enough to allow enough polymer chain mobility for crystallization to occur, but not so high as to induce significant sticking or even melting of the filament. For PLA it was found that a temperature which is within the range of 70° C. to 100° C. is a good general temperature range. The required time for the heat treatment depends on the temperature, and is recommended to be no less than 1 hour, and preferred to be 2 hours or more. For example, the optimum heat treatment profile for a PLA filament produced using 4043D from NatureWorks LLC was found to be 90° C. for 2 hours.

Nucleating agents may be used to expedite the heat-treat step, by increasing the rate of nucleation for the crystallization process. Examples of nucleating agents are: talc, silica, graphite, clay, inorganic salts, organic metal salts, inorganic pigments (such as titanium dioxide or carbon black), metal oxides, amides, and esters. Such nucleating agents can accordingly be included in the PLA at a level which is within the range of about 0.1 weight percent to about 2 weight percent. In cases where nucleating agents are included they are typically present at a level with is within the range of 0.5 weight percent to 1 weight percent.

It is critical to maintain the physical dimensions unchanged or of little change before and after the heat-treat step. In addition to the temperature, the draw ratio and spooling are both important. The draw ratio should not be too large, as a large draw ratio was found to cause too much kinkiness, change in diameter, and also sticking of the filament. The draw ratio should be in the range of 1 to 3.5, and is preferred to be in the range of 1.1 to 1.75. Spooling gives the filament slight tension, without which the filament will become kinky and the dimensions can change significantly. Since most 3D printing filaments are supplied in spools, it is also convenient to heat-treat the filament in spooled form.

The PLA filament disclosed in this invention, unlike any other PLA filaments made using conventional processes, exhibits high degrees of crystallinity. The degree of crystallinity can be characterized using differential scanning calorimetry (DSC). In a typical DSC experiment, a small (several mg) sample of the filament is heated at a constant heating rate, from ambient or sub-ambient temperature to a high temperature that is higher than the Tm of the filament. The heat flow data is collected and plotted against temperature. The degree of crystallinity can be calculated as:

$$\chi(100\%) = \frac{\Delta H_m - \Delta H_c}{\Delta H_f} \times 100\%$$

where $\Delta H_m$, $\Delta H_c$ and $\Delta H_f$ are the heat of melting, heat of cold crystallization, and heat of fusion, respectively. $\Delta H_m$ and $\Delta H_c$ can be determined by integrating the endothermic melting peak and the exothermic cold crystallization peak, respectively, on the DSC curve. $\Delta H_f$ is taken from literature as 146 kJ/mol (Polymer Data Handbook, Oxford University Press, Inc., 1999). The key features of the PLA filament manufactured using the disclosed method are:

(1) The filament is fully crystallized and exhibit no or minimal cold crystallization ($\Delta H_c \sim 0$) (whereas conventional, amorphous PLA will exhibit cold crystallization);

(2) The filament exhibits a degree of crystallinity in the range of 5-40%, more typically in the range of 10-30%.

The filament can be manufactured into almost any diameter. However the most commonly used diameters for 3D printing are about 1.75 mm and 3 mm. It is important for the diameter to have a small variation, as large variations in diameter can lead to poor printing quality and feeding problems. It is preferred for the filament to have a variation of less than ±0.1 mm.

Figure 1:
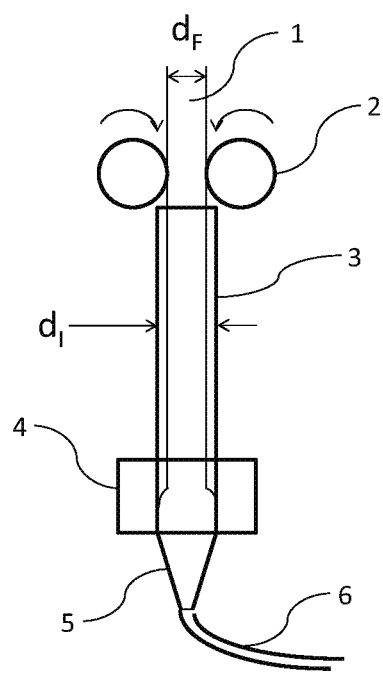
FIG. 1 is an illustration showing a typical printer head or extruder as is used in additive manufacturing printers.

The filament useful herein is a solid, crystalized PLA filament at room temperature and/or at the temperature it is loaded into the printer and/or the printing head. This contrasts with other printers which employ, for example, liquid printing solutions. Without intending to be limited by theory, it is believed that the solid PLA filaments herein are able to be applied via, for example, direct mechanical pressure of the filament via the rollers 2 in FIG. 1 which then feed the filament to the heater block 4. The PLA is then melted by the heater block 4 and extruded out of the nozzle 5 to form the printed object 6. The PLA extruded from the nozzle typically cools down immediately upon extrusion from the nozzle 5 so as to then solidify into the printed object 6 formed from crystalized PLA. Accordingly, it is believed that due to the high Tg and crystallinity of the present filaments, the printed object 6 (formed from crystalized PLA) will more quickly reach the desired hardness. Furthermore, it is believed that the use of such a filament will reduce premature softening of the filament in the barrel of the printer and swollen polymers in the barrel, so as to avoid increased viscosity in the barrel. This in turn is believed to produce more consistent feeding of the PLA though the nozzle and to significantly reduce jamming of the printer/extruder. Without intending to be limited by theory, it is also believed that the present invention allows maintained and/or improved printing quality as the filament diameter may more closely match the internal diameter of the filament barrel. This also reduces the need for an active or passive cooling element on the filament barrel, thereby reducing printer complexity.

The filament should be reasonably straight in order to feed properly into the printing head. As straightness or kinkiness is difficult to define, here we use a practical testing method to verify the straightness. The method involves passing the filament through a ring gauge with an internal diameter of $d_F$+0.15 mm ($d_F$ being the average filament diameter) and a thickness of 8.5 mm at a speed of about 50 meters/minute. If the filament has large kinks, it will not be able to pass the ring gauge. These tests can be used as a quality assurance step for the filament with it being important for the filament to be capable of passing through the ring gauge at a speed of 50 meters per minute without breaking.

In addition to PLA, the filament can contain other ingredients, such as, but not limited to: colorants, pigments, fillers, fibers, plasticizers, nucleating agents, heat/UV stabilizers, process aids, impact modifiers, and other additives.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

PLA (grade 4043D from NatureWorks LLC) in the form of pellets was extruded using a 30 mm single-screw extruder equipped with a gear pump and a cylindrical die with a diameter of 2.25 mm to manufacture filament with a targeted diameter of 1.75 mm (draw ratio=1.286). The processing parameters are shown in Table 1. The extrudate was subsequently water-cooled, stretched by a puller to a final diameter of about 1.75 mm (continuously monitored by a dual-axis laser micrometer) and collected as a continuous filament on a large spool. The collected filament, without any post-processing, is designated as the "as-extruded filament".

TABLE 1

| 1 (feed zone) | 2 (compression zone) | 3 (metering zone) | 4 (flange) | 5 (gear pump entrance) | 6 (gear pump) | 7 (die) | Gear pump (rpm) |
|---|---|---|---|---|---|---|---|
| 170° C. | 200 | 210 | 210 | 205 | 205 | 210 | 15 |

The filament on the large spool was then transferred to smaller spools. Each smaller spool contains about 750 grams of the as-extruded filament. The smaller spools loaded with as-extruded filaments were placed in a convection oven at 90° C. for 4 hours and then cooled in air to room temperature. The filament was designated as "heat-treated filament".

The as-extruded filament and heat-treated filament were passed through a dual-axis laser micrometer to measure the diameter profile. The results are shown in Table 2.

TABLE 2

|  | As extruded | Heat-treated |
|---|---|---|
| Average diameter (mm) | 1.754 | 1.756 |
| Standard deviation (mm) | 0.016 | 0.017 |
| Maximum diameter (mm) | 1.799 | 1.793 |
| Minimum diameter (mm) | 1.729 | 1.730 |

As Table 2 suggests there was very little change in physical dimensions before and after the heat-treat step. The heat-treated filament has almost identical appearance to the as-extruded filament, based on visual inspection. Both filaments can pass a ring gauge with an internal diameter of 1.90 mm and a thickness of 8.5 mm at a speed of about 50 m/min.

Example 2

Figure 3:
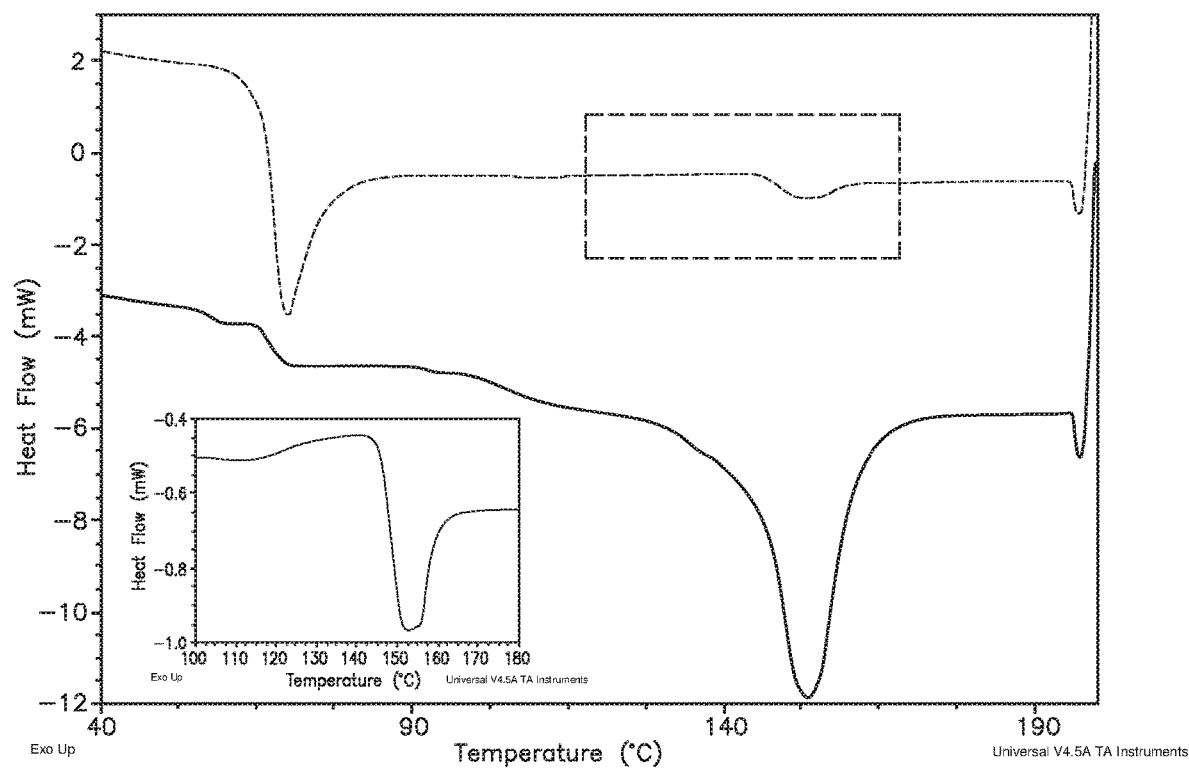
FIG. 3 provides the DSC of as-extruded and heat-treated filaments which were made in accordance with the techniques of this invention.

The as-extruded and heat-treated filaments in Example 1 were tested on a DSC instrument (Q2000, TA Instruments). The samples were heated from 20° C. to 200° C. at a heating rate of 40° C./min. The results are shown in FIG. 3. The dashed and solid curves are from the as-extruded filament and the heat-treated filament, respectively. Both samples show a glass transition at about 65° C. The as-extruded filament displays a peak at Tg due to physical aging. The main difference between the two filaments is in the melting behavior. The as-extruded filament shows both cold-crystallization and subsequent melting (see the inset in FIG. 3 for a magnified view of area in the dashed box). The degree of crystallinity is very low, i.e. <0.5%. Therefore the material remains almost completely amorphous. In contrast, the heat-treated filament shows no cold crystallization, indicating that the material had fully crystallized. The degree of crystallinity of the heat-treated filament is (calculated from the melting peak) about 15%.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A filament for use as a feedstock in three-dimensional printing, said filament being a solid filament which consists of crystalized poly(lactic acid), optionally, one or more nucleating agents, optionally, one or more colorants, optionally, one or more pigments, optionally, one or more fillers, optionally, one or more plasticizers, optionally, one or more heat/IV stabilizers, and optionally, one or more impact modifiers, wherein said crystalized poly(lactic acid) has a degree of crystallinity which is within the range of 10 percent to 40 percent, wherein said filament has a diameter which is within the range of 1.65 mm to 1.85 mm or which is within the range of 2.75 mm to 3.15 mm, wherein said filament is capable of passing through a ring gauge having an internal diameter which is 0.15 mm larger than the average diameter of the filament at a speed of 50 meters/minute without breaking, and wherein the crystalized poly(lactic acid) has a d-lactic acid content which does not exceed 15% percent, and wherein the filament is on a spool.

2. The filament as specified in claim 1, wherein said filament has a diameter which is within the range of 1.70 mm to 1.80 mm.

3. The filament as specified in claim 1, wherein said filament has a diameter which is within the range of 2.80 mm to 3.05 mm.

4. The filament for use in three-dimensional printing as specified in claim 1, wherein said crystalized poly(lactic acid) has a melting point which is within the range of about 145° C. to about 185° C.

5. The filament as specified in claim 4, wherein said crystalized poly(lactic acid) has a degree of crystallinity which is within the range of 10 percent to 30 percent.

6. The filament as specified in claim 1, wherein said crystalized poly(lactic acid) exhibits virtually no heat of crystallization.

7. The filament as specified in claim 1, wherein the poly(lactic acid) contains a nucleating agent, and wherein the nucleating agent is present at a level which is within the range of 0.1 weight percent to 2 weight percent.

8. The filament as specified in claim 1, wherein the poly(lactic acid) contains a nucleating agent, and wherein the nucleating agent is present at a level which is within the range of 0.5 weight percent to 1 weight percent.

9. The filament as specified in claim 7, wherein the nucleating agent is an inorganic pigment.

10. The filament as specified in claim 7, wherein the nucleating agent is an organic metal salt.

11. The filament as specified in claim 7 wherein the nucleating agent is a metal oxide.

12. The filament as specified in claim 7, wherein the nucleating agent is silica.

13. The filament as specified in claim 1, wherein the poly(lactic acid) contains a carbon black.

14. A filament for use as a feedstock in three-dimensional printing, said filament being a solid filament which consists of crystalized poly(lactic acid), optionally, one or more nucleating agents, optionally, one or more colorants, optionally, one or more pigments, optionally, one or more fillers, optionally, one or more plasticizers, optionally, one or more heat/IV stabilizers, and optionally, one or more impact modifiers, wherein said crystalized poly(lactic acid) has a degree of crystallinity which is within the range of 10 percent to 40 percent, wherein said filament has a diameter which is within the range of 1.65 mm to 1.85 mm or which is within the range of 2.75 mm to 3.15 mm, wherein the filament is adapted for use in fused filament fabrication additive manufacturing, wherein said filament is capable of passing through a ring gauge having an internal diameter which is 0.15 mm larger than the average diameter of the filament at a speed of 50 meters/minute without breaking, and wherein the crystalized poly(lactic acid) has an l-lactic acid content which is within the range of 85 percent to 100 percent, and wherein the filament is adapted for use in fused deposition modeling and is on a spool.

15. The filament as specified in claim 14 wherein said crystalized poly(lactic acid) has a melting point which is within the range of about 145° C. to about 185° C.

16. The filament as specified in claim 1, wherein said crystalized poly(lactic acid) is void of nucleating agents.

17. The filament as specified in claim 1, wherein said crystalized poly(lactic acid) has a degree of crystallinity which is within the range of 10 percent to 28 percent.

18. The filament as specified in claim 1, wherein said crystalized poly(lactic acid) has a degree of crystallinity which is within the range of 10 percent to 25 percent.

19. The filament as specified in claim 1, wherein said crystalized poly(lactic acid) has a degree of crystallinity which is within the range of 10 percent to 20 percent.

20. The filament as specified in claim 1, wherein said crystalized poly(lactic acid) has a degree of crystallinity which is within the range of 10 percent to 15 percent.

* * * * *